Jan. 13, 1931.  R. F. HAUGHEY  1,788,833
MILL FOR MANUFACTURING LAP WELD TUBING
Original Filed April 22, 1925
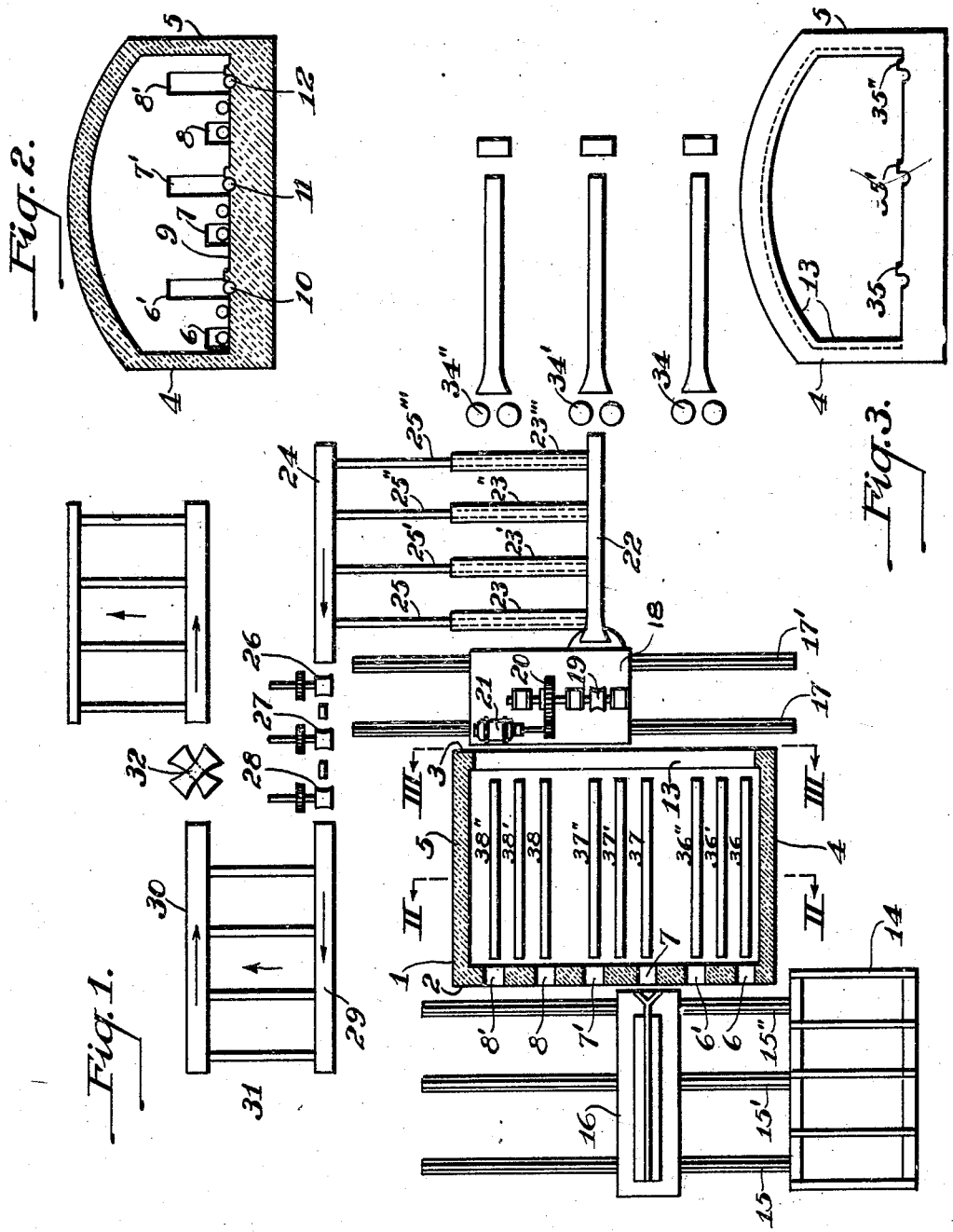
WITNESSES
INVENTOR
Rodger F. Haughey
by
Winter Brown & Critchlow
his Attorneys.

Patented Jan. 13, 1931

1,788,833

UNITED STATES PATENT OFFICE

RODGER F. HAUGHEY, OF McKEESPORT, PENNSYLVANIA

MILL FOR MANUFACTURING LAP-WELD TUBING

Original application filed April 22, 1925, Serial No. 25,153. Divided and this application filed October 23, 1926. Serial No. 143,603.

The invention relates to a method of manufacturing lap-weld tubing, this application being a division of my co-pending application Serial No. 25,153 filed April 22, 1925.

The object of the invention is to provide an improved method of manufacturing lap-weld tubing whereby a minimum number of workmen may with the essential apparatus carry on the necessary operating steps without interference with each other and with or by the apparatus, and with consequent increase in efficiency and output without impairing the quality of the product.

The essential apparatus now used in the heating and forming steps of the manufacture of lap-weld tubing are a furnace, a mechanism for charging the furnace with preformed skelp, and a pair of welding rolls between which heated skelp is passed and welded, a welding head or ball being held on the end of a rod in the pass of the welding rolls and within the skelp being welded. Preformed skelp is charged into the heating furnace by the charging apparatus, it is then manipulated by a skilled operator known as a turner-down, and when sufficiently heated it is pushed from the furnace into the pass or bite of the welding rolls by a skilled operator known as a welder who handles the skelp either manually or by suitable apparatus which is sometimes an adjunct to the charging apparatus. As heretofore carried out, the method of forming lap-weld tubing by the use of this essential apparatus has resulted in necessary delays in the performance of the required steps with consequent and corresponding diminution in output.

According to this invention preformed skelp is charged into the rear of a furnace by suitable charging apparatus, it is turned down by an operator who manipulates it from the front of the furnace, and by a welder who operates from the rear of the furnace it is pushed into welding rolls arranged in front of the furnace. The hearth of the furnace is provided with a plurality of run-out gutters and the furnace is constructed to receive and simultaneously heat a plurality of preformed skelp. With this arrangement of apparatus and positioning of the operators, skelp is repeatedly charged into the furnace adjacent to the run-out gutters successively from a given to the other end of the furnace. After being so charged it is repeatedly turned down into the gutters successively from said given to the other end of the furnace, and is repeatedly pushed out of the furnace into the welding rolls successively from said given to the other end of the furnace. In performing their several operations, the turner-down follows the welding rolls as they are moved from said given to the other end of the furnace, and the welder precedes the charging apparatus as it is operated to charge skelp into the furnace.

The invention may be more fully understood by explaining it with reference to the accompanying drawings of which Fig. 1 is a plan view of a welding furnace in horizontal section; Fig. 2 a transverse vertical section taken substantially on the line II—II of Fig. 1; and Fig. 3 an elevational view showing the discharge end of the furnace taken substantially in the plane indicated by the line III—III of Fig. 1.

Referring to the drawings, 1 designates generally a welding furnace, having the rear wall 2, front wall 3, and the oppositely disposed side walls 4 and 5. The rear wall 2 is equipped with a plurality of spaced apart charging openings 6, 7 and 8, arranged in a series extending transversely of the furnace, and also with another set of combined welding and observation openings 6', 7' and 8'. The opening 6' is disposed adjacent the charging opening 6, as clearly indicated in Figs. 1 and 2, and the remaining openings 7' and 8' correspondingly located with respect to the remaining charging openings 7 and 8. The two openings 6 and 6' thus form a pair of coordinated openings, the remaining openings forming similar pairs, all of which are suitably spaced from each other transversely of the furnace.

As clearly shown in Fig. 2 of the drawings, the combined welding-observation openings 6', 7' and 8' are of considerably greater height than the charging openings 6, 7 and 8, so as to not only provide ample space for the insertion of the tools employed by the welder in handling the work, but to provide a clear vision to the opposite side of the furnace, all for a purpose which will presently appear. The lower portions of all of these openings, both the charging and the welding-observation openings terminate at the upper surface of the hearth 9 which is equipped at points opposite the welding-observation openings with run-out gutters such as indicated at 10, 11 and 12. These run-out gutters are of the usual form with curved bottoms into which the lower portions of the welding-observation openings merge. The front wall 3 is provided with an elongated discharge opening 13 which extends throughout a sufficient extent transversely of the furnace so as to lie in longitudinal alignment with all of the openings in the rear wall, thus providing no obstruction to the discharge of the material from the furnace or the vision of the welder in feeding the blanks to the welding rolls.

Disposed at the rear side of the furnace is a feed table or shelf 14 upon which the blanks may be placed preliminarily to their being charged into the furnace 1. A number of tracks such as shown at 15, 15', 15'' extend transversely from the table 14 along the entire width of the furnace at the rear side thereof, and upon which is adapted to travel the charging mechanism shown at 16.

A pair of tracks 17, 17' likewise extend transversely of the furnace at the front side thereof and at one of their extremities, that indicated at the upper portion of Fig. 1, project a considerable distance beyond the side wall 5. A supporting truck 18 is mounted for bodily movement upon the rails 17, 17' and carries a pair of welding rolls 19 which are adapted to be driven through suitable gearing such as shown at 20 by a driving motor 21 located at one side of the truck.

Rigidly attached to the truck 18 and extending forwardly thereof is a receiving trough 22 which is equipped with a plurality of spaced apart skid supporting members 23, 23', 23'' and 23''', and as illustrated in the drawings are in the form of hollow cylinders. Spaced from the receiving trough 22 is a second fixed receiving trough 24 equipped with the laterally extending skid supporting members 25, 25', 25'' and 25''', the terminals of which are telescopically received by the members 23 to 23'''. The members 23 to 23''' together with the members 25 to 25''' thus form an extensible skid interposed between the troughs 22 and 24.

Disposed in longitudinal alignment with the trough 24 are a plurality of finishing rolls 26, 27 and 28 which are adapted to deliver the tubes to a trough 29 which is laterally spaced from a trough 30, the troughs 29 and 30 being suitably connected by the interposed skids indicated at 31. Spaced at a convenient distance from the trough 30 is a cooling table 33, suitable cross rolls 32 being interposed between the trough 30 and the cooling table. Pairs of bar pulling rolls 34, 34' and 34'' are preferably disposed in alignment with the several openings 6', 7' and 8' of the furnace so that the bars will not become excessively heated as would be the case if a single bar were used for welding all the skelp.

In order to provide a limiting stop for the blanks as they are fed into the run-out gutters 10 to 12, the hearth 9 is preferably equipped with an upstanding rib located immediately adjacent each of the run-out gutters, such as indicated at 35, 35' and 35'' in Figs. 2 and 3 of the drawings.

For convenience of description, a number of blanks have been illustrated in Fig. 1 of the drawings, and designated as 36, 36', 36'', 37, 37', 37'' and 38, 38', 38'', although it will be understood that the invention may be practiced by two or more groups of blanks, and by a different number of blanks in each group.

The improved method of welding tubes as practiced with the furnace and its associated apparatus will now be described:— The operator generally designated the charger initially charges the skelp or blanks into the furnace successively through the series of charging openings 6, 7 and 8, the first skelp being charged by means of the charging mechanism 16 through the charging opening 6 into the furnace, and the charging mechanism then brought in turn opposite the charging openings 7 and 8 for this purpose. In other words, the charging mechanism is moved transversely of the furnace upon its supporting rails 15, 15' and 15'' after charging through opening 6 until brought opposite the charging opening 7 when another skelp or blank is charged into the interior of the furnace through the charging opening 7, and then moved to a position to charge a skelp or blank in like fashion through the charging opening 8. The charging mechanism may carry sufficient skelp to charge all of the openings while moving transversely of the furnace or it may return to the shelf table 14 for each charge.

At this stage, the furnace will contain blanks in the positions indicated at 36, 37 and 38 of the drawings. Each blank after remaining in the furnace in this position for a period of about one minute, is shifted from a position opposite the charging openings 6 to 8, to a position intermediate the charging openings and the run-out gutters 10 to 12, or, if desired, directly into the run-out gutters. This shifting is accomplished by the turner-down who, by means of a picker, first shifts the blank 36 to the position indicated at 36', and in like fashion successively shifts in turn the remaining blanks located opposite the charging openings from the positions indicated at 37 and 38 to those indicated at 37' and 38′, respectively. Immediately after the turner-down has shifted a blank in this manner, beginning with the blank opposite the charging opening 6, the charging mechanism 16 having been brought back to a position to inject another skelp or blank through the charging opening 6, blanks are again charged into each of the charging openings in succession, following the shifting of the respective blanks previously charged into the furnace, and the blanks constituting the original charge are then shifted from their positions 36′, 37′ and 38′ into the run-out gutters 10, 11 and 12, Fig. 2. In other words, a new blank is charged into the furnace through each of the charging openings 6 to 8 in consecutive order as soon as the previously charged blanks have been shifted from their positions opposite the charging openings following the shifting of the blanks from the positions 36′, 37′ and 38′ to their positions 36″, 37″ and 38″ in the run-out gutters 10, 11 and 12, Fig. 2.

After the blanks have been moved into the run-out gutters and brought to the desired condition for welding, they are discharged from the furnace through the discharge opening 13 into the welding rolls 19 which are brought into the proper position transversely of the furnace to successively receive the tubes from the several run-out gutters. As in the case of charging the blanks into the furnace, and in their being turned down into the run-out gutters, the welder also manipulates the several tubes consecutively in regular order beginning with the tube occupying the position indicated at 36″, then feeding in order the remaining tubes 37″ and 38″ into the welding rolls. During the welding of the consecutive tubes, the truck 18 is moved progressively from a position adjacent the side wall 4 to a point beyond the side wall 5, and during such movement the skids formed by the members 23 to 23‴ and 25 to 25‴ provide an extensible skid the length of which is automatically adjusted to properly coordinate the receiving trough 22 which receives the welded tubes from the welding rolls 19 for transferring them into the receiving trough 24 from which the tubes pass to the finishing rolls 26 to 28, in an obvious fashion, as will be clear from an inspection of Fig. 1 of the drawings.

During the travel of the truck 18 in the manner described above, from its position adjacent the side wall 4 to a point beyond the side wall 5, the turner-down follows immediately behind the truck and accomplishes the turning down of the successive tubes in order in the manner set forth, then retraces his steps so that the welding rolls 19 may be brought opposite the first of the series of run-out gutters.

The welder, located at the rear of the furnace with the charger precedes the charging mechanism 16 in its travel transversely of the furnace. By arranging the charging mechanism at the rear of the furnace and bodily movable transversely thereof, with the welding rolls at the front of the furnace and also bodily movable in the manner described, and accomplishing the charging, the turning down, and the welding of the several blanks consecutively in the manner set forth, the entire series of necessary operative steps may be readily and conveniently performed without interference on the part of the several workmen and with the result that the welder is constantly supplied with a sufficient number of tubes for welding to keep him busily employed. In other words, the welder can weld the several tubes at the same intervals as required for the turner-down to shift one of the tubes from its charged position to its position in the run-out gutter.

Due to the fact that the charger, the turner-down and the welder can be carrying out their respective operations simultaneously, but at different positions transversely of the furnace, the tubes are heated and welded without interference and without interruption of the operating sequence whereby the production quantity is substantially increased without necessitating a duplication in the number of turners-down.

Although the invention has been described as practiced by certain apparatus which is the subject matter of a copending application it is to be understood that the method of manufacturing tubing as herein set forth may be carried out by other suitable apparatus, and is not limited to the use of the structure shown and described.

I claim:

1. A lap-weld tube mill comprising in combination a skelp heating furnace having a hearth provided with a plurality of run out gutters successively spaced from one end of the furnace to the other and side and end walls, a transversely movable charging apparatus arranged adjacent the rear side and a transversely movable welding apparatus arranged adjacent the front side of the furnace, the side wall adjacent said charging apparatus being provided with a plurality of spaced charging and push out openings each of said charging openings being adjacent a pushout opening and on the same side of the furnace therefrom and arranged in associated relation with said run out gutters and the side adjacent said welding apparatus with an elongated discharge opening disposed in alinement with all of said charging and push out openings, said charging apparatus being adapted for feeding skelp successively into said spaced charging openings and to permit a welder to move freely in front thereof and successively push skelp by way of said push out openings from said run out gutters into said welding apparatus, and said welding apparatus being adapted to move across the front of the furnace to receive skelp successively from the foremost to the last run out gutter and to permit a turner down to follow thereafter and freely manipulate the skelp being heated in the furnace from one end of the furnace to the other in successive and continuous steps without interference from the welding apparatus.

2. A lap-weld tube mill comprising in combination a skelp heating furnace having a hearth provided with a plurality of run out gutters successively spaced from one end of the furnace to the other and side and end walls, a transversely movable charging apparatus arranged adjacent the rear side and a transversely movable welding apparatus arranged adjacent the front side of the furnace, the side wall adjacent said charging apparatus being provided with a plurality of spaced charging and push out openings arranged in associated relation with said run out gutters and the side adjacent said welding apparatus with an elongated discharge opening disposed in alinement with all of said charging and push out openings, said charging apparatus being adapted to move from a point beyond the first push out opening into alinement with the last charging opening to permit feeding of skelp successively into said charging openings from one end of the furnace to the other and to also permit a welder to move freely in front thereof and without interference therewith in such a manner as to permit him to move skelp by way of said push out openings from successive gutters into said welding apparatus without interference from said charging apparatus and said welding apparatus being adapted to move across the front of the furnace to receive skelp successively from the foremost to the last run out gutter and also sufficiently therebeyond to permit a turner down to follow thereafter and freely manipulate the skelp being heated in the furnace from one end of the furnace to the other in successive and continuous steps without interference from the welding apparatus.

In testimony whereof I sign my name.

RODGER F. HAUGHEY.